July 18, 1933.  J. L. FORSYTH  1,918,257
CLAMP FOR PULLEY BELTS
Filed April 18, 1932

Inventor
J. L. Forsyth.
By Lacey & Lacey, Attorneys

Patented July 18, 1933

1,918,257

UNITED STATES PATENT OFFICE

JAMES LEE FORSYTH, OF SMACKOVER, ARKANSAS, ASSIGNOR OF ONE-HALF TO JOHN MURRY SMITH, OF SMACKOVER, ARKANSAS

CLAMP FOR PULLEY BELTS

Application filed April 18, 1932. Serial No. 606,035.

This invention relates to belt clamps of that general type having jaws which are applied to the lapped ends of a belt to hold them together and obviate lacing or riveting.

A further object of the invention is to provide a belt clamp which will fit closely to the belt when in operation and will be devoid of upstanding bolts or similar projections which might catch in the clothing of workmen.

A further object is to provide a belt clamp which will be simple in design, light in weight, easy to apply, less cumbersome, and cheaper to construct than ordinary belt clamps, and which when applied will positively hold the ends of the lap in alignment.

A further object of the invention is to provide a novel belt clamp having clamp jaws equipped with interfitting spurs and grooves on their opposing faces so that slipping of the ends of the lap will be positively prevented.

A further object is to provide novel trusses on the backs of the jaws for strengthening the jaws to resist strains and stresses.

A further object is to provide clamp jaws having the ends extended and provided with seats to receive couplings so that endwise dislodgement of the couplings from the jaws will be positively prevented under severe conditions of service.

A further object is to provide novel couplings for holding the jaws in working position, these couplings being equipped with adjusting bolts for adjusting the pressure of the jaws on the belt when necessary.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

Figure 1:
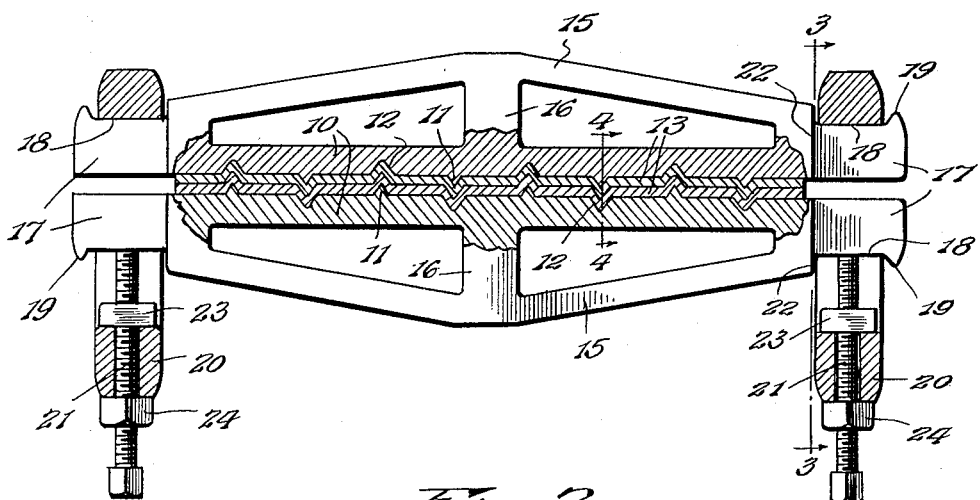
Figure 2:
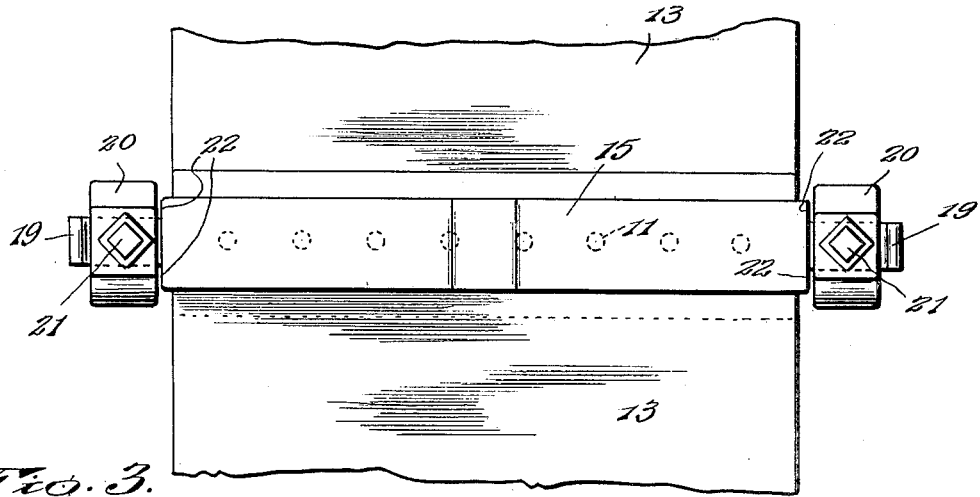
Figure 3:
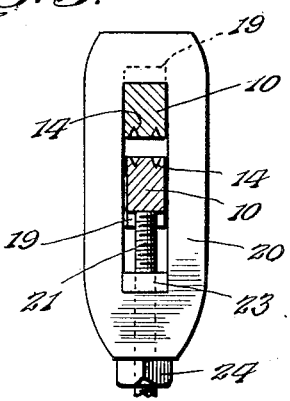
Figure 4:
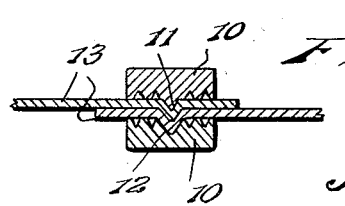

In the accompanying drawing forming part of this specification,

Figure 1 is a front elevation, partly in section, showing a belt clamp constructed in accordance with the invention, Figure 2 is a bottom plan view of the belt clamp, Figure 3 is a cross section taken on the line 3—3 of Figure 1 showing one of the couplings in elevation, and, Figure 4 is a cross section taken on the line 4—4 of Figure 1 showing the interfitting working faces of the jaws.

Referring now to the drawing in which like characters of reference designate similar parts in the various views, the belt clamp is shown to comprise a pair of straight jaws 10 having interfitting spurs 11 and notches 12, as best shown in Figure 4, on their opposing working faces to indent the lapped ends 13 of the belt and prevent slipping thereof through the jaws. For the same purpose the working face of both jaws are provided with longitudinal serrations or corrugations 14, best shown in Figure 3.

Each jaw is provided on the rear face with an integral truss comprising a longitudinal brace 15 of substantially V-shape and a center post 16, as best shown in Figure 1. This truss lies in the plane of the jaw in its entirety and strengthens the jaw to resist buckling under the stresses and strains of severe conditions of service.

The ends of each jaw are extended beyond the jaw proper to provide longitudinal lugs 17 which are reduced in cross dimension to lie within the sides of the jaw and truss, as best shown in Figure 2. These lugs are cut away on the rear edges to provide depressions or seats 18 that terminate in transverse stop shoulders 19 at the outer ends.

Couplings are applied to the lugs 17 of the jaws to unite the jaws, each coupling comprising an elongated eye 20 which is of sufficient length to easily slip endwise on and off the lugs 17 of both jaws, as shown in Figure 1. The eyes are seated in the seats 18 of one of the jaws and each eye is provided with an adjusting screw 21 which is screwed tightly into contact with the seat 18 of the other jaw, as shown, to force the jaws toward each other. By virtue of the lugs 17 being reduced in cross dimension it will be observed that stop shoulders 22 are formed at the inner ends of the seats in the lugs and these stop shoulders co-act with the stop shoulders 19 at the outer end of the lug in positively preventing endwise movement of the couplings in either direction when the screws 21 are tightened.

Each screw 21 is provided with a pair of lock nuts 23 and 24, the former being applied to the screw inside of the coupling eye, and the latter being applied to the screw outside of the coupling eye. These lock nuts may be tightened as desired to hold the screws in adjusted positions.

In applying the belt clamp the two jaws are placed on the lap of the two ends 13 of the belt which may extend over each other sufficiently to allow for changes of length as may be required for repairs, etc. The coupling eyes 20 are now applied to the lugs 17 and the set screws 21 are then tightened to clamp both jaws tightly against the lapped ends of the belt.

From the above description it is thought that the construction and operation of this invention will be fully understood without further explanation.

What is claimed is:

1. A belt clamp comprising clamping jaws having interfitting projections and depressions on their working faces, each jaw terminating at the ends in longitudinally disposed lugs reduced in dimensions transversely to provide stop shoulders at the inner ends of the lugs, said lugs being cut away to form seats on the rear faces, said lugs thereby terminating at the outer ends of said seats in stop shoulders, coupling eyes seated in said seats of one of said jaws and retained against endwise escape therefrom by said inner and outer stop shoulders, set screws passed through said eyes and bearing against one pair of said lugs to hold the jaws in operative position, and lock nuts on said set screws engaging the inner and outer faces of the coupling eyes.

2. A belt clamp comprising clamping jaws having longitudinally serrated working faces provided with interfitting projections and depressions, each jaw having a longitudinal truss integral with the rear side thereof and disposed in the plane of the jaws for reinforcing the jaws to resist stresses and strains, lugs projecting from the ends of the jaws and provided with seats, coupling eyes encircling the lugs at corresponding ends of the jaws and seated in the seats of one of the jaws, set screws carried by the eyes and seated in the seats of the other jaw, and lock nuts on the set screws bearing against the inner and outer faces of the coupling eyes.

3. A belt clamp comprising clamping jaws provided with integral longitudinal trusses on the rear faces of the jaws, lugs projecting from the ends of the jaws and being cut away on rear faces to form seats, said lugs thereby terminating in stop shoulders at the outer and inner ends of said seats, coupling eyes seated in said seats of one of said jaws between said stop shoulders, and set screws passed through said eyes and bearing against one pair of said lugs.

JAMES LEE FORSYTH. [L. S.]